US008820677B2

(12) United States Patent  
Rajashekara et al.

(10) Patent No.: US 8,820,677 B2  
(45) Date of Patent: Sep. 2, 2014

(54) AIRCRAFT POWER SYSTEMS AND METHODS

(75) Inventors: Kaushik Rajashekara, Carmel, IN (US); George A. Pontones, Indianapolis, IN (US)

(73) Assignee: Jason A. Houdek

( * ) Notice: Subject to any disclaimer, the term of this patent is extended or adjusted under 35 U.S.C. 154(b) by 99 days.

(21) Appl. No.: 13/163,680

(22) Filed: Jun. 18, 2011

(65) Prior Publication Data

US 2012/0318914 A1  Dec. 20, 2012

(51) Int. Cl.
| | |
|---|---|
| *B64D 41/00* | (2006.01) |
| *H02J 9/06* | (2006.01) |
| *H02J 1/10* | (2006.01) |
| *H02J 3/38* | (2006.01) |

(52) U.S. Cl.
CPC ........... *B64D 41/00* (2013.01); *H01M 2250/20* (2013.01); *H02J 1/10* (2013.01); *B64D 2041/005* (2013.01); *Y02T 90/36* (2013.01); *B64D 2221/00* (2013.01); *H02J 9/066* (2013.01); *H02J 3/387* (2013.01); *Y02T 50/54* (2013.01); *Y02T 90/32* (2013.01)
USPC .............................. 244/58; 244/53 R; 244/60

(58) Field of Classification Search
USPC ............................................ 244/53 R, 58, 61
See application file for complete search history.

(56) References Cited

U.S. PATENT DOCUMENTS

| | | | |
|---|---|---|---|
| 6,296,957 B1 * | 10/2001 | Graage | 429/425 |
| 6,568,633 B2 | 5/2003 | Dunn | |
| 6,834,831 B2 | 12/2004 | Daggett | |
| 7,380,749 B2 | 6/2008 | Fucke et al. | |
| 2006/0054740 A1 | 3/2006 | Hoffjann et al. | |
| 2006/0237583 A1 | 10/2006 | Fucke et al. | |
| 2007/0284480 A1 | 12/2007 | Atkey et al. | |
| 2008/0001026 A1 | 1/2008 | Hoffjann et al. | |
| 2008/0210812 A1 | 9/2008 | Gans et al. | |
| 2009/0070091 A1 | 3/2009 | Hanke et al. | |
| 2010/0270858 A1 | 10/2010 | Foch et al. | |
| 2011/0315815 A1 * | 12/2011 | Finney | 244/58 |
| 2012/0013177 A1 * | 1/2012 | Krenz et al. | 307/9.1 |

FOREIGN PATENT DOCUMENTS

| | | |
|---|---|---|
| EP | 2 399 829 A2 | 12/2011 |
| JP | 2001334998 A | 12/2001 |
| JP | 2007 015423 A | 1/2007 |

OTHER PUBLICATIONS

UKIPO Search Report, Rolls-Royce Corporation, GB 1210677.9, Oct. 12, 2012.
English language Abstract for JP 2007 015423 A, Jan. 25, 2007.
United Kingdom Search Report, GB1210677.9, Apr. 12, 2013.
English Language Abstract, JP2001334998, Apr. 12, 2013.

\* cited by examiner

*Primary Examiner* — Tien Dinh  
*Assistant Examiner* — Nicholas McFall  
(74) *Attorney, Agent, or Firm* — Krieg DeVault LLP

(57) ABSTRACT

One embodiment of the present application is directed to a unique method for powering one or more critical loads in an aircraft. Another embodiment is a unique apparatus for powering one or more critical loads upon failure of one or more engines. Other embodiments include unique methods, systems, devices, and apparatus' for powering power loads in an aircraft. Further embodiments, forms, features, aspects, benefits, and advantages of the present application shall become apparent from the description and figures provided herewith.

13 Claims, 3 Drawing Sheets

AIRCRAFT POWER SYSTEMS AND METHODS

FIELD OF THE INVENTION

The present invention relates to aircraft power systems, and more particularly, but not exclusively, to aircraft emergency power systems and methods.

BACKGROUND

In many aircraft, the aircraft's main engines provide propulsion for the aircraft, and also provide power to the aircraft's electrical power system generally by driving a generator. In the event of an engine failure or multiple engine failures, it is desirable to provide power to the aircraft's electrical power system in order to compensate for the loss of power that was generated by the main engines.

There remains a need for more efficient and more precise approaches to power loads when an aircraft is not in a normal operating condition. Accordingly, further contributions are needed in this area of technology.

SUMMARY

One embodiment of the present application is directed to a unique method for powering one or more critical loads in an aircraft. Another embodiment is a unique apparatus for powering one or more critical loads upon failure of one or more engines. Other embodiments include unique methods, systems, devices, and apparatus' for powering power loads in an aircraft. Further embodiments, forms, features, aspects, benefits, and advantages of the present application shall become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
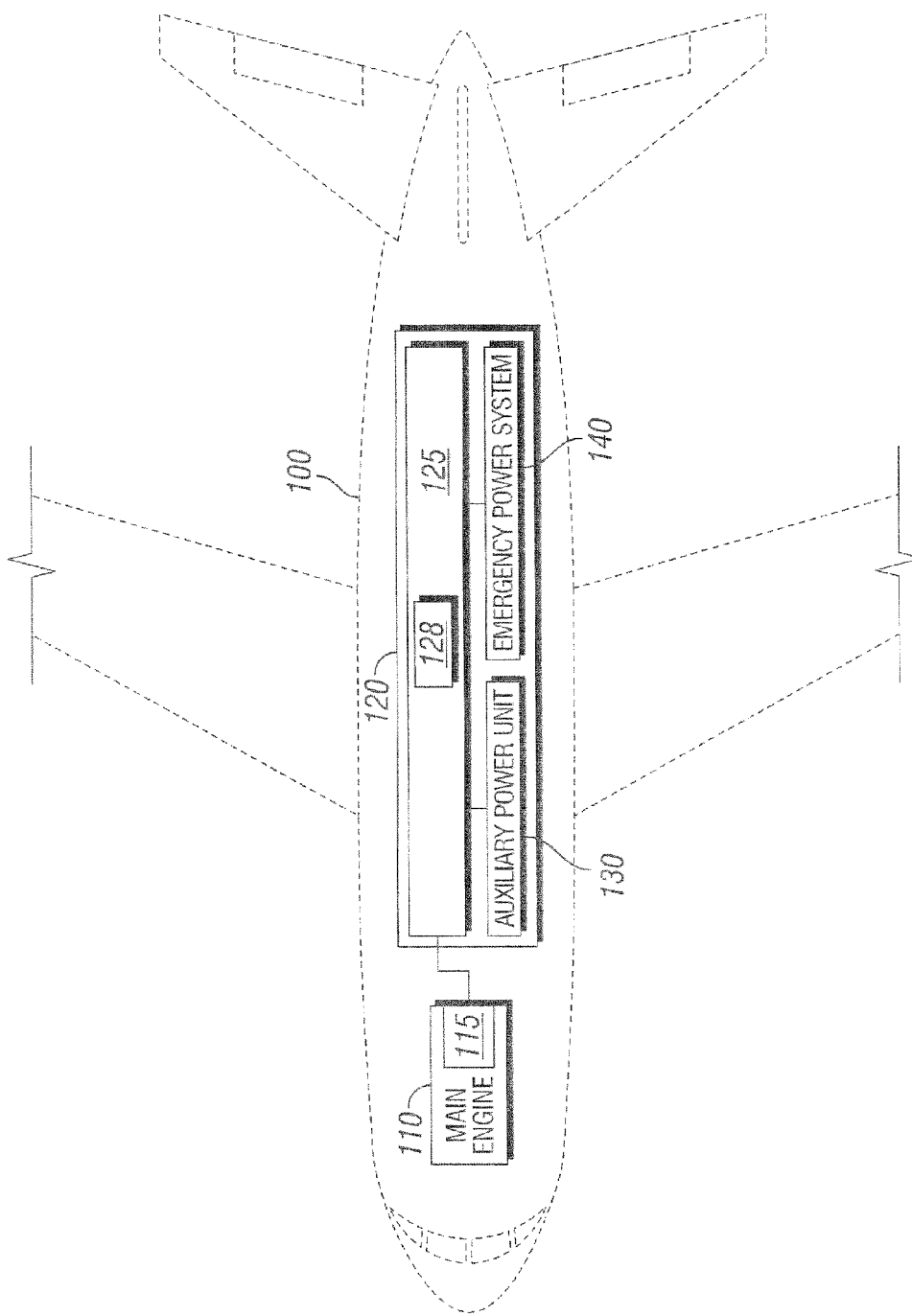
FIG. 1 illustrates some aspects of a non-limiting example of an aircraft in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

In modern aircraft, and particularly in More Electric Aircraft (MEA) systems, the total electrical power required for non-propulsion use, including critical loads, is generally increasing due to the replacement of some or all hydraulic and/or pneumatic systems with electrical systems, as well as due to the use of new devices, flight controls, and landing gear systems that rely on electrical power. As a result, more electrical power is required from an emergency power system to power critical loads when one or more of the propulsion engines and/or other engines used to generate electrical power in an aircraft fail. Power from a typical emergency power generator alone, e.g., under some aircraft operating conditions, may not be sufficient to power the critical aircraft loads. However, increasing the size of the emergency power generator to provide sufficient power under all operating conditions may result in an emergency power generator that is larger than necessary, e.g., for steady-state conditions.

In one embodiment of the present application, the power from an emergency power generator is supplemented with power from a fuel cell, and in some embodiments, another electrical power source, such as a battery. In one form, in the event of failure of one or more of the engines, the fuel cell and/or other electrical power source powers the critical loads until the emergency power generator output is sufficient for powering the critical loads. In other embodiments, the emergency power generator may power the critical loads until the fuel cell output is sufficient for powering the critical loads. In one form, once the emergency power generator starts generating electric power, power from the emergency power generator may be combined with power from the fuel cell and/or other electrical power source to power the critical loads. In some embodiments, the emergency power generator may power most, if not all, of the critical loads, while the fuel cell powers other loads. In some embodiments, the emergency power generator may be reduced in size because of the addition of the fuel cell system, e.g., relative to other systems that do not employ fuel cell systems for electrical power generation. In some embodiments, power output from the emergency power system may be combined with the power output from one or more of the engines that have not failed but do not otherwise have the capacity to satisfy critical and/or other loads.

Referring to FIG. 1, some aspects of a non-limiting example of an aircraft 100 in accordance with an embodiment of the present invention are schematically illustrated. Aircraft 100 includes, among other things, one or more of an engine 110, and includes a power system 120. In one form, engine 110 is configured as a propulsion power plant for providing propulsive thrust to aircraft 100. In one form, engine 110 is a gas turbine engine. In a particular form, engine 110 is a turbofan engine. In other embodiments, engine 110 may take other forms, and may be, for example, a turboshaft engine, a turboprop engine, a turbojet engine, a combined cycle engine or any other type of engine, gas turbine or otherwise. As shown in FIG. 1, engine 110 is coupled to a generator 115. Generator 115 is electrically coupled to power system 120. Generator 115 is configured to supply electrical power to power system 120, e.g., electrical loads. In addition, in various embodiments, engine 110 may be configured to supply hydraulic power and/or pneumatic power, e.g., bleed air, to power system 120.

In one form, power system 120 includes various loads 125 associated with aircraft 100, including critical loads. Generator 115 is coupled to and configured to supply electrical power to loads 125, including critical loads. Loads 125 may include, for example and without limitation, flight computer systems, navigational and communication systems, radar systems and other hazard detection/avoidance systems, flight control surface positioning systems, landing gear systems, air conditioning systems for the cabin, hydraulic systems, and any other device or component that requires electrical, hydraulic and/or pneumatic power to operate, depending upon the particular application. Power system 120 includes an engine powered auxiliary power unit (APU) 130 and an emergency power system 140. In various embodiments, APU 130 may include one or more generators (not shown) and/or hydraulic pumps (not shown) that are driven by one or more APU engines (not shown). In some embodiments, the hydraulic pumps may be electric motor driven hydraulic pumps. In various embodiments, APU 130 is configured to provide electrical power, hydraulic power and/or pneumatic power to loads 125 on aircraft 100 when aircraft 100 is undergoing ground operations, whereas generally, engine 110 provides the power for loads 125 during normal flight operations. In some embodiments, APU 130 may supply power for loads 125 in addition to or in place of engine 110 during normal flight operations.

Emergency power system 140 is configured to provide power to certain loads when aircraft 100 is not operating in a normal condition, such as when aircraft 100 is operating in an in-flight emergency condition. For example, in situations where one or more engines 110 fail during aircraft 100 flight operations, auxiliary power unit 130 may be incapable of providing all of the required power for loads 125, or may be incapable of providing any power, e.g., depending upon the altitude of aircraft 100. As another example, a failure of APU 130 may otherwise leave aircraft 100 without sufficient power in situations where one or more engines 110 have failed.

Emergency power system 140 is configured to supply power to certain loads 125 in the event of a failure scenario in which engine(s) 110 and/or APU 130 are incapable of providing sufficient power to loads 125, which is referred to as an emergency operating condition. During emergency operating conditions, emergency power system 140 supplements or replaces power that would otherwise be provided by engine 110 and/or auxiliary power unit 130. In particular, emergency power system 140 is configured to provide power to aircraft critical loads 128. Critical loads 128 in aircraft 100 are a subset of loads 125, for example and without limitation, loads that are deemed critical to flight safety, and loads that are critical to passenger health. Critical loads 128 may include, for example and without limitation, flight control systems, flight control surface positioning systems, communication, navigation and hazard detection/avoidance systems, other avionic systems, landing gear systems, environmental control systems, and other systems, such as hydraulic systems, including electric motor-driven hydraulic pumps and hydraulic systems powered thereby.

As set forth herein emergency power system 140 includes an emergency power generator and a fuel cell for powering critical loads 128 when aircraft 100 is operating in an emergency operating condition (e.g., inoperative engines 110 and flight at an altitude where APU 130 is not capable of providing adequate or any power). The emergency power generator and the fuel cell provide power to critical loads 128 during emergency operating conditions. During the amount of time required for the emergency power generator to spool up and generate the required power, the fuel cell provides power to the critical loads. In some embodiments, one or more batteries or other electrical power sources may be employed, e.g., to provide power until the fuel cell is able to supply sufficient power. Emergency power system 140 thus provides redundancy for powering critical loads 128, thereby improving the safety of aircraft 100.

Figure 2:
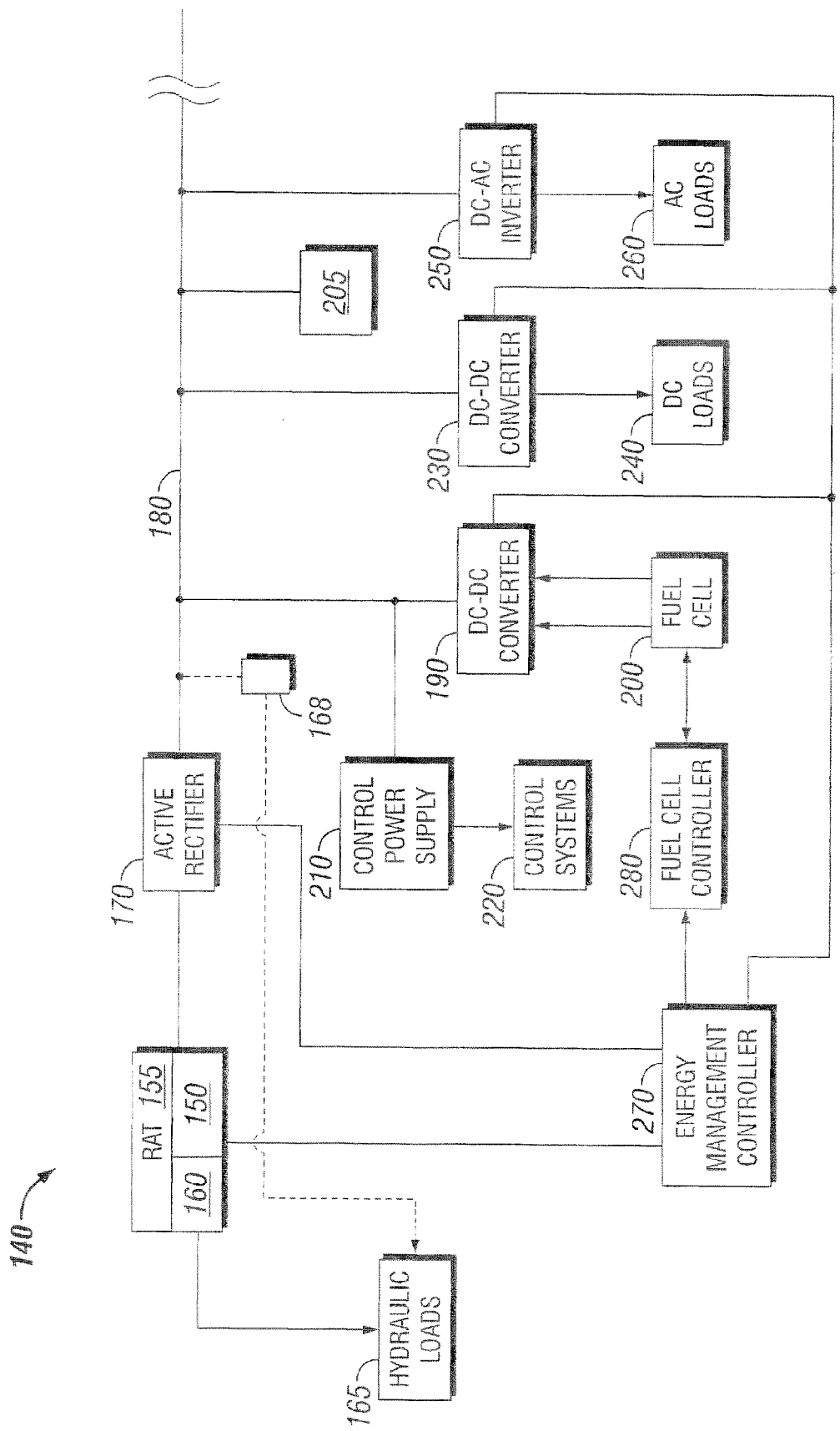
FIG. 2 is a schematic diagram illustrating some aspects of a non-limiting example of an emergency power system in accordance with an embodiment of the present invention.

Referring to FIG. 2, some aspects of a non-limiting example of an emergency power system 140 in accordance with an embodiment of the present invention are schematically depicted. Emergency power system 140 includes an emergency power generator 150 and a ram air turbine (RAT) 155. RAT 155 is configured to generate mechanical power from the airstream adjacent to aircraft 100 that results from the forward motion of aircraft 100 through the air during flight operations. In one form, RAT 155 is normally disposed internal to aircraft 100, and is deployed externally to aircraft 100 into the airstream adjacent to aircraft 100 in response to the occurrence of emergency operating conditions. In other embodiments, RAT 155 may be disposed within aircraft 100 and be supplied with flowing air from the airstream via an inlet and ducting system (not shown).

RAT 155 is configured to supply shaft power to drive emergency power generator 150. In one form, emergency power generator 150 is an air driven generator (ADG) 150 coupled directly to and deployed with RAT 155. In other embodiments, emergency power generator 150 may be physically positioned away from RAT 155, and supplied with shaft power from RAT 155, e.g., via a shaft and/or belt drive system. Emergency power generator 150 is configured to generate electrical power, e.g., AC power, when driven by RAT 155, e.g., during emergency operating conditions. Under normal operating conditions, RAT 155 is not deployed or otherwise supplied with flowing air from the airstream adjacent to aircraft 100, and emergency power generator 150 does not produce power.

In one form, the AC power produced by emergency power generator 150 is three-phase AC power. In other embodiments, other types of AC power may be employed, including single-phase and multi-phase. In one form, emergency power generator 150 is a synchronous generator, e.g., having a substantially constant speed, controlled by a clutch mechanism (not shown). In other embodiments, emergency power generator 150 may be an asynchronous generator. In still other embodiments, other generator or alternator types may be employed, at fixed or variable speeds.

In one form, emergency power system 140 also includes a hydraulic pump 160 coupled to and driven by RAT 155. Hydraulic pump 160 is configured to convert shaft power from RAT 155 to hydraulic power for use by critical hydraulic loads 165 of aircraft 100, which are a subset of critical loads 128. In other embodiments, emergency power system 140 may not include a hydraulic pump coupled to and driven by RAT 155. Some embodiments of aircraft 100 may not include critical hydraulic loads 165, whereas other embodiments may include critical hydraulic loads 165 that are powered by one or more electric-motor driven hydraulic pumps 168 that are powered by emergency power generator 150.

In one form, emergency power generator 150 is coupled to a rectifier 170. Rectifier 170 is electrically coupled to a DC bus 180. Rectifier 170 is configured to rectify the output of emergency power generator 150 and supply the rectified DC voltage to DC bus 180. In one form, rectifier 170 is an active rectifier. In some embodiments, active rectifier 170 may be configured to improve the power factor of emergency power generator 150. In other embodiments, rectifier 170 may be a passive rectifier. In one form, the DC voltage supplied by rectifier 170 is 270V DC. In other embodiments, other voltage levels may be employed.

In one form, emergency power system 140 also includes a DC-DC converter 190 and one or more of a fuel cell 200. DC-DC converter 190 is coupled to DC bus 180. Fuel cell 200 is coupled to DC-DC converter 190. DC-DC converter 190 is configured to receive electrical power from fuel cell 200, which generates a DC voltage, and to convert the DC voltage from fuel cell 200 into an appropriate DC voltage for DC bus 180 and supply the converted DC voltage to DC bus 180. Rectifier 170 and DC-DC converter 190 convert the AC voltage from emergency power generator 150 and the fuel cell 200, respectively, to the same DC voltage and output that DC voltage onto DC bus 180. In some embodiments, a DC-DC converter may not be employed, e.g., where the output of fuel cell 200 is appropriate for direct use DC bus 180.

Under normal operating conditions, fuel cell 200 is used as a stand-by power source for critical loads 128. In one embodiment, under emergency operating conditions, until emergency power generator 150 has achieved sufficient output to satisfy the power requirements for critical loads 128, e.g., during deployment and startup of RAT 155 and emergency power generator 150, fuel cell 200 provides the power to some or all critical loads 128, e.g., including electrically-driven hydraulic pumps. In one form, fuel cell 200 is a solid oxide fuel cell. In other embodiments, other fuel cell types may be employed, for example and without limitation, in other embodiments, fuel cell 200 may be a proton exchange membrane fuel cell, a molten carbonate fuel cell, or any other fuel cell suitable for operation in aircraft 100. In some embodiments, fuel cell 200 may be operated to continue to supply power to critical loads 128 in parallel to emergency power generator 150.

In one form, fuel cell 200 is maintained in a standby mode during normal aircraft 100 operations, which allows fuel cell 200 to quickly shift into power production mode in the event of an occurrence of emergency operating conditions. In some embodiments, fuel cell 200 may not be operated in a standby mode during normal aircraft 100 operations. In such embodiments, emergency power system 140 may include a battery and/or one or more other electrical energy storage systems 205 coupled to DC bus 180, which may be employed to provide power to critical loads 128 until fuel cell 200 has been started and has reached sufficient output levels to power critical loads 128 without the assistance of battery and/or other electrical energy storage system 205. In other embodiments, a battery and/or one or more other electrical energy storage systems may not be employed. Other electrical energy storage systems may include, for example and without limitation, flywheel/motor/generator systems that convert between flywheel inertial energy and electrical energy.

In one form, emergency power system 140 includes a control power supply 210 coupled to DC bus 180 and coupled to one or more control or other control systems 220. In one form, systems 220 are critical loads, and are a subset of critical loads 128. In other embodiments, some or all of systems 220 may not be critical loads. Control power supply 210 is configured to receive a DC voltage from DC bus 180, to convert the DC voltage from DC bus 180 into a DC voltage suitable for systems 220, for example and without limitation, 28V DC, and to supply that voltage to one or more control systems 220. Systems 220 may include, for example and without limitation, flight control systems and/or other aircraft 100 components and systems.

In one form, emergency power system 140 includes a DC-DC converter 230 coupled to DC bus 180 and to one or more DC loads 240. In one form, DC loads 240 are critical loads, and are a subset of critical loads 128. In other embodiments, DC loads 240 may not include critical loads. DC-DC converter 230 is configured to receive power from emergency power generator 150, fuel cell 200 and/or battery and/or other electrical energy storage system 205 through DC bus 180. DC-DC converter 230 is configured to convert the DC voltage from DC bus 180 into one or more DC voltages suitable for the one or more DC loads 240. DC-DC converter 230 is configured to supply the converted DC voltages to the one or more DC loads 240, which may include, for example and without limitation, one or more full authority digital engine control (FADEC) systems and/or one or more various MEA systems and/or other aircraft 100 systems.

In one form, emergency power system 140 also includes a DC-AC inverter 250 coupled to DC bus 180 and to one or more AC loads 260. In one form, AC loads 260 are critical loads, and are a subset of critical loads 128. In other embodiments, one or more AC loads 260 may not include critical loads. DC-AC inverter 250 is configured to receive the DC power from DC bus 180 and to convert the DC voltage into one or more AC voltages such as 115V AC. DC-AC inverter 250 is configured to supply the AC voltages to the one or more AC loads 260, which may include, for example and without limitation, electrically driven hydraulic systems, environmental control systems (ECS) and/or other aircraft 100 systems.

In some embodiments, emergency power system 140 includes an energy management controller 270 and a fuel cell controller 280. Energy management controller 270 is coupled to emergency power generator 150, rectifier 170, DC bus 180, DC-DC converter 190, DC-DC converter 230, DC-AC inverter 250, and fuel cell controller 280. Fuel cell controller 280 is coupled to fuel cell 200. Energy management controller 270 is configured with operating logic for controlling emergency power generator 150, rectifier 170, DC-DC converter 190, DC-DC converter 230, DC-AC inverter 250, and fuel cell controller 280. Fuel cell controller 280 is configured with operating logic to control the operations of fuel cell 200. Energy management controller 270 may also be in communication with other controllers or sensors on aircraft 100, e.g., sensors that may transmit a signal to energy management controller 270 indicating that aircraft 100 is not operating in a normal condition and request deployment of RAT 155 and startup of emergency power generator 150.

In one form, during the operation of aircraft 100, if energy management controller 270 receives an indication (e.g., a signal) that aircraft 100 is not operating in a normal condition (e.g., an engine 110 failure), energy management controller 270 activates RAT 155 and emergency power generator 150 by sending a signal. In some embodiments, energy management controller 270 may control how power from emergency power generator 150 and/or fuel cell 200 is distributed, e.g., including prioritizing which critical loads 128 receive power in the event emergency power system 140 is unable to supply power to all critical loads 128. In some embodiments, energy management controller 270 may send a signal to active rectifier 170 to control the DC voltage output by rectifier 170 to DC bus 180.

In one form, emergency management controller 270 is configured to transmit a signal to fuel cell controller 280 indicating a failure of one or more of the main engines. In embodiments wherein fuel cell 200 is kept in standby mode during normal aircraft operation, fuel cell controller 280 is configured to transmit a command signal to fuel cell 200 to switch from standby mode to power production mode in response to the failure(s), in order to power critical loads 128. In other embodiments, fuel cell controller 280 may transmit a signal to fuel cell 200 to start up fuel cell 200 to power critical loads 128 upon detection of the failure of the engine(s). In still other embodiments, other control means to activate fuel cell 200 may be employed. In some embodiments, fuel cell controller 280 is configured to control the voltage level and power outputs of fuel cell 200. In some embodiments, emergency management controller 270 is configured to transmit a signal to engage the battery and/or other electrical energy storage system 205 to power the critical loads until fuel cell 200 and/or emergency power generator 150 have been started and have achieved sufficient output to power critical loads 128.

In one form, energy management controller 270 is configured to determine the amount of power to be drawn from each fuel cell 200 and emergency power generator 150 by transmitting signals to fuel cell controller 280 and emergency power generator 150, respectively, e.g., to optimize the total flow of power drawn from fuel cell 200 and emergency power generator 150 when both are in operation. This may increase or maximize the duration of provision of emergency power to critical loads 28 under adverse conditions, e.g., at low altitudes under emergency conditions. In other embodiments, the power balance as between emergency power generator 150 and fuel cell 200 may be otherwise determined. In some embodiments, energy management controller 270 is configured to determine the amount of power to be drawn from each of fuel cell 200, emergency power generator 150 and battery and/or other electrical energy storage system 205, e.g., to optimize the total flow of power to critical loads 28.

In one form, management controller 270 is configured to transmit a signal to DC-DC converter 230 and DC-AC inverter 250 to control the operation of DC-DC converter 230 and DC-AC inverter 250. For example, in the event emergency power generator 150 and fuel cell 200 are not providing sufficient electrical power for all electrical critical loads 128, management controller may alter or eliminate the power flow to DC loads 240 and/or AC loads 260, in order to provide power to other critical loads 128. In other embodiments, DC-DC converter 230 and DC-AC inverter 250 may be otherwise controlled.

It is contemplated that in some embodiments, energy management controller 270 and fuel cell controller 280 may be combined into one controller. Furthermore, it is contemplated that in some embodiments, energy management controller 270 may be in communication with other controllers and/or sensors on aircraft 100 to receive other information regarding the status other aircraft 100 components and/or systems, and/or to transmit control signals to other aircraft 100 components and/or systems, including some or all of loads 125 and/or critical loads 128. Received information may include indications, for example and without limitation, that one or more of engines 110 has failed, that auxiliary power unit 130 cannot provide all of the aircraft's required power, and/or auxiliary power unit 130 has failed. Control signals may include, for example and without limitation, signals instructing one or more loads 125 and/or critical loads 125 to shut down or change operating modes in response to the occurrence of emergency operating conditions and the present capability of emergency power system 140 to supply power to such loads.

During emergency operating conditions on aircraft 100, e.g., during and subsequent to an engine 110 failure, emergency power generator 150 and fuel cell 200 provide the power to critical loads 128. The power output of RAT 155 and hence emergency power generator 150 varies with the altitude and speed of aircraft 100, with the available power from emergency power generator 150 being lower at lower altitudes. In some embodiments, in situations where conditions are such that emergency power generator 150 output is insufficient to meet power demand, e.g., when aircraft 100 is at lower altitudes and/or speeds, fuel cell 200 provides supplemental power, in order to maximize the capability to provide power to critical loads 128. In various embodiments, fuel cell 200 may be used to supply power to critical loads 128 in emergency operating conditions during only certain flight conditions or throughout all flight conditions.

Figure 3:
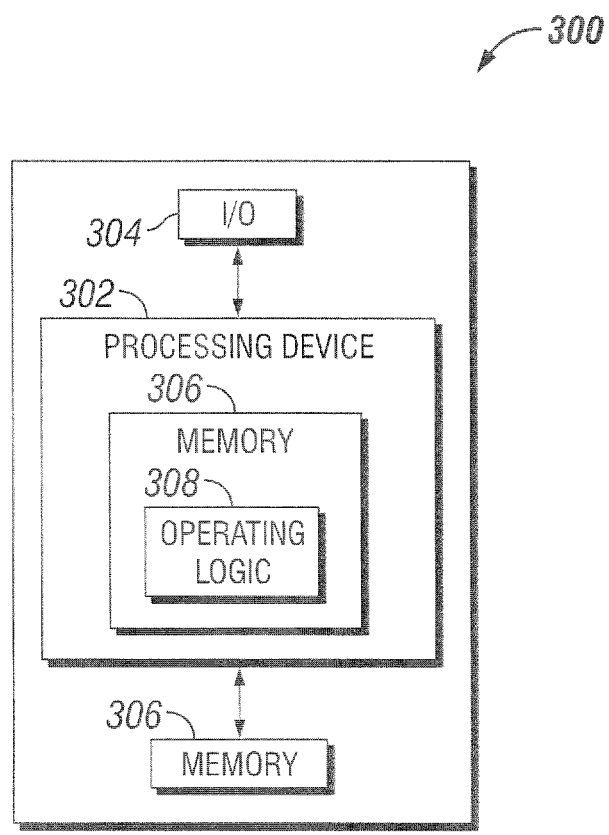
FIG. 3 is a schematic diagram illustrating some aspects of a non-limiting example of a controller in accordance with an embodiment of the present invention.

Referring to FIG. 3, a schematic diagram illustrates some aspects of a non-limiting example of a controller 300 in accordance with an embodiment of the present invention. In various embodiments, controller 300 may be employed as one or both of energy management controller 270 and fuel cell controller 280 shown in FIG. 2. Controller 300 includes a processing device 302, an input/output device 304, a memory 306, and operating logic 308.

In various embodiments, processing device 302 may be of a programmable type, a dedicated, hardwired state machine, a combination of these or any other type of processor suitable for use as an energy management controller and/or fuel cell controller. In addition, some embodiments of processing device 302 may include multiple processors, Arithmetic-Logic Units (ALUs), Central Processing Units (CPUs), or the like. In other embodiments, other types of processing devices may be employed in addition to or in place of those mentioned herein. For forms of processing device 302 with multiple processing units, distributed, pipelined, and/or parallel processing may be utilized as appropriate. In various embodiments, processing device 302 may be dedicated to performance of just the operations described herein or may be utilized in performing one or more additional operations. In the depicted form, processing device 302 is of a programmable variety that executes algorithms and processes data in accordance with operating logic 308 as defined by programming instructions (e.g., such as software or firmware) stored in memory 306. Alternatively or additionally, operating logic 308 for processing device 302 is at least partially defined by hardwired logic or other hardware. In various embodiments, processing device 302 may be formed of one or more components of any type suitable to process the signals received from input/output device 304 or elsewhere, and provide desired output signals. Such components may include digital circuitry, analog circuitry, or a combination of both.

Input/output (I/O) device 304 is configured to perform input/output operations for processing device 302 for communications to and from components of emergency power system 140. In some embodiments, I/O device 304 is also configured to perform input/output operations for processing device 302 for communications to and from other components and/or systems of aircraft 100, e.g., in some embodiments including critical loads 128 or other loads 125. I/O device 304 may be any type of I/O device or combination of I/O devices that allows controller 300 to communicate with other devices and components, such as emergency power generator 150, rectifier 170, DC-DC converter 190, DC-DC converter 230, DC-AC inverter 250, and/or other controllers or devices, and provides for transmitting and receiving data from various devices, such as sensors. In various embodiments, input/output device 304 may be comprised of hardware, software, and/or firmware. It is contemplated that in some embodiments, input/output device 304 includes a plurality of ports for transmitting and receiving data.

Memory 306 may be of one or more memory types, such as a solid-state variety, electromagnetic variety, optical variety, or a combination of these forms. In various embodiments, memory 306 may be volatile, nonvolatile, or a combination of both. In some embodiments, some or all of memory 306 may be of a portable and/or mass storage variety, such as a disk, tape, memory stick, cartridge, or the like. In various embodiments, memory 306 stores data that is manipulated by operating logic 308 of processing device 302, such as data representative of signals received from and/or sent to input/output device 304 in addition to or in lieu of storing programming instructions defining operating logic 308, just to name one example of many. In one form, memory 306 is considered a part of processing device 302. In other embodiments, memory 306 may be coupled to processing device 302.

Some embodiments of the present invention may provide, for example, for supplying reliable power after an engine failure over the entire operating regime of aircraft 100, even during at lower altitudes, e.g., due to the inclusion of fuel cell 200. As another example, more electrical loads can be powered under emergency conditions, e.g., due to the inclusion of fuel cell 200, as compared to some other emergency power systems that do not employ one or more fuel cells.

As yet another example, the size of emergency power generator 150 may be made smaller than otherwise, because fuel cell 200 provides power that may otherwise be required to be supplied by an emergency power generator alone. In relatively large aircraft, the power requirement for critical loads is approximately 60-80 KVA. In a relatively medium-sized aircraft, the power requirement is approximately 40-50 KVA. Once the peak power requirements for critical loads for an aircraft have been determined, the capacity of the fuel cell can be determined, and then an emergency power generator may be chosen, which is generally smaller due to the addition of the fuel cell. In some embodiments, emergency power generator 150 is configured to supply the full power requirement for critical loads 128. In other embodiments, emergency power generator 150 is not capable of supplying the full power requirement for critical loads, but rather, is used in conjunction with fuel cell 200 to meet the power requirements for critical loads 128. In some embodiments, fuel cell 200 is configured to supply the full power requirement for critical loads 128, in which case emergency power generator 150 may be used to supply power to non-critical loads.

In one embodiment, a method of supplying power to the critical loads in an aircraft when one or more of the engines of the aircraft fail includes using a fuel cell in parallel with an emergency power generator to supply power to some or all critical loads.

In another embodiment, a battery is used in parallel with the emergency power generator and fuel cell to provide the required power. The battery is connected to the DC bus to provide power to any loads connected to the DC bus.

In yet another embodiment, the emergency power generator powers the most critical loads, whereas one or more fuel cells provide the power to less critical and other needed loads during the entire flight with the failed main engines.

In still another embodiment, under normal operating conditions, the fuel cell powers the critical loads. In another embodiment, in normal operating conditions, the fuel cell is operating in a stand-by mode with a minimum amount of power output to power some critical loads.

Embodiments of the present invention include a method, comprising: monitoring an operating condition of an engine of an aircraft; starting an emergency power generator when the operating condition indicates a failure of the engine; and powering critical loads in the aircraft using power from a fuel cell and the emergency power generator.

In a refinement, the method further comprises powering the critical loads with the fuel cell until a power output of the emergency power generator is sufficient to power the critical loads.

In another refinement, the method further comprises powering the critical loads using power from only the emergency power generator once the power output of the emergency power generator is sufficient to power the critical loads.

In yet another refinement, the method further comprises powering other aircraft electrical loads using power from the fuel cell while the emergency power generator powers the critical loads.

In still another refinement, the method further comprises powering the critical loads with the fuel cell and with the emergency power generator until a power output of the emergency power generator is sufficient to power the critical loads alone.

In yet still another refinement, the method further comprises powering at least one critical load using the fuel cell while the aircraft is operating in a normal condition.

In a further refinement, the method further comprises powering only the critical loads with the fuel cell until the emergency power generator is capable of powering the critical loads, then powering other loads with the fuel cell.

In a yet further refinement, the aircraft includes more than one engine and the operating condition indicates a failure of all of the engines.

In a still further refinement, the aircraft includes more than one engine and the operating condition indicates a failure of one of the engines.

In a yet still further refinement, the method further comprises powering the critical loads with the emergency power generator, the fuel cell, and a battery.

In yet another refinement, wherein the starting of the emergency power generator includes deploying at least one of a ram air turbine and an air driven generator.

Embodiments of the present invention include an apparatus for powering a critical load upon failure of one or more engines, comprising: an emergency power generator configured to output an AC voltage; a DC bus; a rectifier coupled to the emergency power generator and the DC bus, wherein the rectifier is configured to convert the AC voltage from the emergency power generator to a DC voltage; and wherein the rectifier is configured to output the DC voltage to the DC bus; a fuel cell; a DC-DC converter coupled to the fuel cell; wherein the DC-DC converter is coupled to the DC bus; and wherein the fuel cell is configured to provide power to the DC bus via the DC-DC converter; and a controller configured to activate the emergency power generator upon the failure of the one or more engines, wherein the controller is structured to control power outputted from the emergency power generator and the fuel cell to power the critical load.

In a refinement, the critical load includes at least one of an AC load and a DC load.

In another refinement, the apparatus further comprises a DC-AC inverter configured to convert the DC voltage on the DC bus to another AC voltage and to provide the other AC voltage to the AC load.

In yet another refinement, the apparatus further comprises a second DC-DC converter configured to convert the DC voltage on the DC bus to another DC voltage and to provide the other DC voltage to the DC load.

In still another refinement, the apparatus further comprises an electric motor-driven hydraulic pump powered by the emergency power generator.

In yet still another refinement, the apparatus further comprises a control power supply coupled to the DC bus.

In a further refinement, the controller is structured to control an amount of power drawn from the emergency power generator and the fuel cell to maximize a duration of provision of emergency power.

In a yet further refinement, the apparatus further comprises a battery coupled to the DC bus and configured to supply power to the DC bus.

In a still further refinement, the emergency power generator is structured to provide three-phase AC power.

In a yet still further refinement, the emergency power generator includes a ram air turbine coupled to a generator.

In another further refinement, the emergency power generator includes an air driven generator.

In yet another further refinement, the emergency power generator includes a variable speed generator.

In still another further refinement, the controller includes a fuel cell controller and an energy management controller.

Embodiments of the present invention include a method, comprising: determining an emergency power requirement for an aircraft, wherein the emergency power requirement includes a critical loads power requirement and an other load power requirement; providing one or more fuel cells, wherein the one or more fuel cells is configured to satisfy the critical loads power requirement; and providing an emergency power generator configured to satisfy the critical loads power requirement alone; wherein the emergency power generator and the fuel cell are configured to jointly satisfy the emergency power requirement.

In a refinement, the emergency power generator is not capable of satisfying the emergency power requirement alone.

In another refinement, the one or more fuel cells are not capable of satisfying the emergency power requirement alone.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A method, comprising:
monitoring an operating condition of an engine of an aircraft;
starting an emergency power generator when the operating condition indicates a failure of the engine to provide sufficient power for critical loads; and
powering only the critical loads in the aircraft using power from a fuel cell and the emergency power generator, wherein the critical loads are loads that are critical to flight safety and loads that are critical to passenger health;
wherein powering only the critical loads comprises:
converting a first AC power from the emergency power generator to a first DC power at a predefined voltage with a first rectifier;
converting a second DC power from the fuel cell to a third DC power at the predefined voltage with a first DC-DC converter;
transferring the first DC power from the emergency power generator and the third DC power from the fuel cell through a DC bus;
transferring a portion of the DC power from the DC bus to a second DC-DC converter;
delivering a fourth DC power from the second DC-DC converter to a critical DC load;
transferring a portion of the DC power from the DC bus to a DC-AC inverter; and
delivering a second AC power from the DC-AC inverter to a critical AC load.

2. The method of claim 1, further comprising:
maintaining the fuel cell in a standby mode during non-emergency aircraft operations;
powering the critical loads with the fuel cell until a power output of the emergency power generator is sufficient to power the critical loads; and
powering at least some of the critical loads with the emergency power generator once the power output of the emergency power generator is sufficient to power the critical loads.

3. The method of claim 2, further comprising:
powering the critical loads using power from only the emergency power generator once the power output of the emergency power generator is sufficient to power the critical loads.

4. The method of claim 2, further comprising:
powering other aircraft electrical loads using power from the fuel cell while the emergency power generator powers the critical loads.

5. The method of claim 1, further comprising:
powering the critical loads with the fuel cell and with the emergency power generator until a power output of the emergency power generator is sufficient to power the critical loads alone.

6. The method of claim 1, further comprising powering at least one critical load using the fuel cell while the aircraft is operating in a normal condition.

7. The method of claim 1, further comprising:
powering only the critical loads with the fuel cell until the emergency power generator is capable of powering the critical loads, then powering other loads with the fuel cell.

8. The method of claim 1, wherein the aircraft includes more than one engine and the operating condition indicates a failure of all of the engines.

9. The method of claim 1, wherein the aircraft includes more than one engine and the operating condition indicates a failure of one of the engines.

10. The method of claim 1, further comprising:
powering the critical loads with the emergency power generator, the fuel cell, and a battery.

11. The method of claim 1, wherein the starting of the emergency power generator includes deploying at least one of a ram air turbine and an air driven generator.

12. The method of claim 1, further comprising storing excess energy from at least one of the fuel cell and the emergency power generator energy in a storage device when the power output of the fuel cell and emergency power generator exceed the power required to meet the critical loads.

13. The method of claim 1, wherein the critical loads are one or more of flight control systems, flight control surface positioning systems, communication, navigation and hazard detection/avoidance systems, other avionic systems, landing gear systems and environmental control systems.

* * * * *